United States Patent [19]

Burgdorf et al.

[11] Patent Number: 5,050,382
[45] Date of Patent: Sep. 24, 1991

[54] TANDEM MASTER CYLINDER FOR HYDRAULIC BRAKE SYSTEMS

[75] Inventors: Jochen Burgdorf, Offenbach-Rumpenheim; Hans-Dieter Reinartz, Frankfurt am Main; Helmut Steffes, Hattersheim, all of Fed. Rep. of Germany

[73] Assignee: ALfred Teves GmbH, Frankfurt am Main, Fed. Rep. of Germany

[21] Appl. No.: 420,187

[22] Filed: Oct. 12, 1989

[30] Foreign Application Priority Data

Oct. 18, 1988 [DE] Fed. Rep. of Germany ....... 3835382

[51] Int. Cl.⁵ ..................... B60T 11/20; B60T 11/232
[52] U.S. Cl. ......................................... 60/589; 60/562
[58] Field of Search ............................... 60/562, 589

[56] References Cited

U.S. PATENT DOCUMENTS

| | | | |
|---|---|---|---|
| 4,505,519 | 3/1985 | Muterel | 60/562 X |
| 4,550,567 | 11/1985 | Schaefer | 60/562 |
| 4,707,989 | 11/1987 | Nakamura et al. | 60/562 X |
| 4,709,551 | 12/1987 | Saalbach et al. | 60/589 |
| 4,858,437 | 8/1989 | Ochiai | 60/562 |
| 4,922,120 | 5/1990 | Becker et al. | 60/562 X |
| 4,939,901 | 7/1990 | Saalbach et al. | 60/562 |

FOREIGN PATENT DOCUMENTS

| | | |
|---|---|---|
| 1199150 | 8/1965 | Fed. Rep. of Germany . |
| 2711296 | 10/1977 | Fed. Rep. of Germany . |
| 3116584 | 11/1982 | Fed. Rep. of Germany ........ 60/589 |
| 3424513 | 1/1986 | Fed. Rep. of Germany . |
| 8544167 | 6/1986 | Fed. Rep. of Germany . |
| 3501659 | 7/1986 | Fed. Rep. of Germany . |
| 3629564 | 3/1988 | Fed. Rep. of Germany . |
| 3731603 | 5/1988 | Fed. Rep. of Germany . |

OTHER PUBLICATIONS

*Alfred Teves (GMBH Brake Handbook,* 8:74–74, Alfred Teves GMBH, 1984.

*Primary Examiner*—Edward K. Look
*Assistant Examiner*—George Kapsalas
*Attorney, Agent, or Firm*—Robert P. Seitter; J. Gordon Lewis

[57] ABSTRACT

A tandem master cylinder for hydraulic brake systems for automotive vehicles, with the brake systems comprising a brake pressure control means, in particular, an anti-locking control means. The tandem master cylinder has a push rod piston (7) and a floating piston (8), with each piston having a central valve. The valve closure member (13) of the central valve in the push rod piston (7) can be controlled both by a pin (16) directly or indirectly abutting the housing of the tandem master cylinder and by a pin (17) coupled to the floating piston.

6 Claims, 1 Drawing Sheet

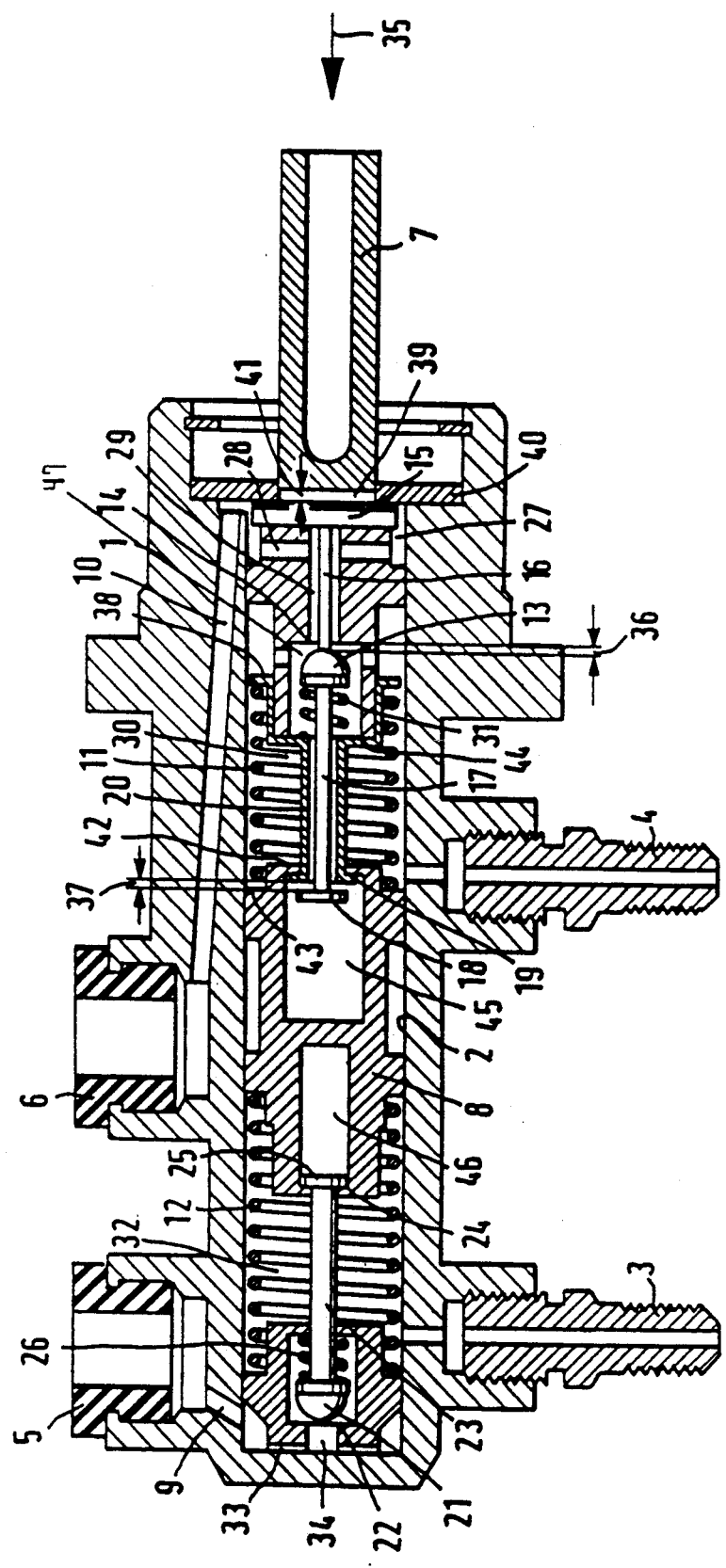

TANDEM MASTER CYLINDER FOR HYDRAULIC BRAKE SYSTEMS

BACKGROUND OF THE INVENTION

The present invention relates to a tandem master cylinder for hydraulic brake systems for automotive vehicles. This tandem master cylinder is particularly useful in brake systems having a brake pressure control means, such as an anti-locking control means, and includes one or several valve elements, with at least one central valve housed within the push rod piston of the tandem master cylinder.

The *ALFRED TEVES GMBH Brake Handbook*, 8th edition, at pages 74 and 75, teaches a tandem master cylinder having two central valves.

German Offenlegungsschrift No. 3629564 describes a brake system which includes a slip control having a pedal-operated brake pressure generator, preferably supported by auxiliary force, to which the wheel brakes are connected through pressure conduits. This brake system further includes an hydraulic auxiliary pressure supply system having a hydraulic pump, a pressure equilibrium and pressure fluid reservoir and an auxiliary pressure control valve. This brake system also includes wheel sensors and electronic circuits for detecting the wheel rotation pattern and for generating electric brake pressure control signals capable of controlling electromagnetically actuated pressure fluid inlet valves and outlet valves located in the pressure fluid conduits to effect slip control.

The brake system in German Offenlegungsschrift No. 3629564 is characterized by a switch in the pressure conduit of the auxiliary force source which is actuated when a predetermined hydraulic pressure is reached. The switch provides an electric signal to the signal processing and logic circuit rendering the pump operative and inoperative during the test cycle and signals the driver, by an optical or acoustical indication, that the motor pump unit is ready to operate.

The lost travel of the central valve of the tandem master cylinder should be minimized. The lost travel, combined with the pedal transmission, results in unacceptably high lost travel of the brake pedal.

The two pistons of the tandem master cylinder should be arranged to be displaceable as a unit. Also, the two central valves of the tandem master cylinder should close simultaneously. Finally, the additive effects of lost motions and closing motions should be eliminated.

SUMMARY OF THE INVENTION

In the present invention, the valve elements or element, in particular the central valves, are arranged to be actuated both by a stop in the housing of the tandem master cylinder and by a stop which functions in cooperation with the floating piston of the tandem master cylinder.

Moreover, a tandem master cylinder, constructed in accordance with the present invention, includes a pressure member in the form of a compressive force transmitting member which directly or indirectly abuts against the housing of the tandem master cylinder and lifts the valve closure member of the central valve off the valve seat. Also included in this tandem master cylinder is a pull member in the form of tensile force transmitting member which abuts against the floating piston and lifts the valve closure member of the central valve off the valve seat.

Provision is made for a captivating member which has a stop for the floating piston and which may be drawn through the floating piston. The floating piston has a stop for the push rod piston through which the captivating member may be pushed. The reset spring of the push rod piston is captivated between the floating piston and a stop of the captivating member.

In one embodiment of the present invention which is easy to manufacture, the captivating member is in the form of a sleeve having one or more radially disposed faces, in particular annular faces, which serve as stops.

The sleeve may have different diameters and may have at least one flange-type end serving as a stop for the reset spring of the floating piston.

To permit the use of simple components, the present invention can include a pull member, preferably of pin-type configuration, which is arranged between the push rod piston and the floating piston, to provide, on the floating piston side end of the tensile member, a stop directly or indirectly cooperating with a stop of the floating piston, and to connect the push rod piston side end of the pull member to the valve closure member of the central valve of the push rod piston.

According to a preferred embodiment of the present invention, the reset spring of the push rod piston is stronger than the reset spring of the floating piston. Thus, the closing motion of the valve closure member of the central valve of the push rod piston is less than the stroke between the stop on the floating piston side end of the pull member and the corresponding stop of the floating piston. The captivating member is movable through the floating piston.

In addition, the captivating member extends into a recess in the floating piston, forming, in the area in which the floating piston is located, the stop for the pull member.

A compact construction is attained in that the captivating member surrounds the pull member and, in the area where the captivating member abuts against the interior of the floating piston, is of a flange-type configuration. The flange-type end of the captivating member serves as a stop of the captivating member on the floating piston, forming a stop for the pull member. Moreover, the pull member is in the form of a pin extending into the floating piston and has a shoulder acting as a stop.

With respect to the construction of the central valve of the floating piston, the closure member of the central valve of the floating piston is disposed externally of the floating piston, preferably in the area of the bottom of the bore of the tandem master cylinder, and the valve closure member of the central valve of the floating piston is actuated by a pull member movable through the floating piston. Moreover, the pull member of the closure member of the central valve of the floating piston is in the form of a pin having, on the floating piston side, a stop, preferably a shoulder, cooperating with a stop of the floating piston and being, on the other central valve side end, connected with the closure member of the central valve of the floating piston.

Further details of the present invention are disclosed by the following description of one embodiment which will be explained with reference to the accompanying drawing.

BRIEF DESCRIPTION OF THE DRAWING

The drawing is a vertical section of a tandem master cylinder constructed in accordance with the present invention.

DETAILED DESCRIPTION OF THE PREFERRED EMBODIMENT

The tandem master cylinder includes a housing 1 having a bore 2. Numerals 3 and 4 identify the pressure connections for two brake actuating circuits. The pressure fluid reservoir (not shown) can be mounted on the connections 5 and 6. The push rod piston is designated by numeral 7, while numeral 8 refers to the floating piston. Intake ports and return ports for pressure fluid are designated by reference numerals 9 and 10.

Associated with the push rod piston is the reset spring 11, while reset spring, 12 is associated with the floating piston. Located in the axial passage 47 of the push rod piston is a central valve consisting of the valve closure member 13 and the valve seat 14. The valve closure member 13 is actuated by the transverse or stop pin 15 and the control or pressure pin 16.

The valve closure member 13 of the central valve in the push rod piston also is actuated by the pin 17 acting as a tension-type anchor. This pin has, on the left-hand end thereof, a shoulder 18 which abuts against the flange-type extension 19 of an element of sheet metal or plastic material. This element will be referred to as the captivating member 20, as it captivates, among things, the push rod reset spring 11. Shoulder 18 of pin 17 and flange-type extension 19 of captivating member 20 are positioned in the recess 45 of the floating piston.

As shown in the drawing, the captivating member 20 is made up of a sleeve having flange-type ends 19 and 38. The transition section from the minor to the major diameter of the captivating member is formed by a radially disposed face 44 which serves as a stop for the push rod piston and the spring 31 of the central valve.

The flange-type end 19 is in abutment with the stop 42 of the floating piston. The flange-type end 38 forms the stop for the reset spring 11. The opposite end of the reset spring is supported on the stop 43 of the floating piston. The flange-type end 19 of the sleeve also serves as the stop for the shoulder 18 of the pin 17. As shown in the drawing, the captivating member 20 surrounds the pin 17.

Reference numeral 21 identifies the valve closure member of the central valve of the floating piston. The associated valve seat is identified by reference numeral 22. The central valve of the floating piston is not within the floating piston itself. The central valve of the floating piston is actuated by the floating piston through pin 23 acting as a pull-type anchor. When the floating piston moves to the right, the valve closure member 21, via stop 24 on the floating piston and via shoulder 25 of pin 23, is lifted off the valve seat as pin 23 moves against the pressure of the central valve spring 26. Shoulder 25 of pin 23 is positioned in a recess 46 of the floating piston.

In the brake release position, with the central valve of the push rod piston open, pressure fluid can flow through the passageway 10, the annular chamber 27, the radial channels 28, the passageway 29 and openings in the central valve into the pressure chamber 30 of the push rod piston.

In the brake release position, with the central valve of the floating piston open, pressure fluid can flow through the passageway 9, the radial channels 33, the passageway 34 and openings (not shown) in the central valve into the pressure chamber 32.

When the brake is applied in the normal brake mode, the push rod piston and the floating piston move to the left and valve closure members 13 and 21 are forced against the associated valve seats 14 and 22 by central valve springs 31 and 26, respectively. Pressure is built up in pressure chambers 30 and 32 and fluid is passed into the two brake actuating circuits through the connections 3 and 4.

Because of the force of the brake force booster acting in the direction of arrow 35, the push rod piston 7 is displaced to the left. At the same time, the floating piston 8 is moved to the left through the reset spring 11 of the push rod piston which is captivated by member 20. The reset spring 11 of the push rod piston is stronger than the reset spring 12 of the floating piston.

Upon commencement of the movement of the push rod piston to the left, relative movement takes place between the push rod piston and pin 17. Under the action of the spring 31 of the central valve, the pin 17 moves to the right relative to the push rod piston. As shown in the drawing, the central valve spring 31 exerts pressure on the valve closure member 13 toward the right. The other end of the central valve spring is supported on the captivating member 20. The central valve in the push rod piston closes. The closing motion of the valve closure member, identified by reference numeral 36, is less than the maximum possible stroke, identified by reference numeral 37, of the shoulder 18 relative to the stop 19. The central valve of the floating piston will close simultaneously with the closing of the central valve in the push rod piston.

With the two pistons in a medium position, an anti-locking control mode is expected to commence. An auxiliary pump of the type described in German Offenlegungsschrift No. 3629564 delivers pressure fluid into the push rod piston circuit. This causes the push rod piston and the floating piston to move apart until the reset spring 11 between the floating piston and the captivating member 20 is expanded. Subsequently, the pistons move apart by the stroke identified by reference numeral 37. At this point, the central valve in the push rod piston will commence its pressure limiting control mode.

In the pressure limiting control mode, a pressure develops in the pressure chamber of the push rod piston and in the pressure chamber of the floating piston and, hence, in the associated brake actuating circuits. The pressure is determined by the force of the brake force booster which is dependent upon the pedal force.

This pressure limiting mode is a breather operation which takes place between the valve closure member 13 of the central valve of the push rod piston and the associated valve seat 14. The breather operation is an opening and closing operation of the central valve in the push rod piston. Predetermined amounts of pressure fluid are delivered from the pressure chamber 30, through the pressure fluid passageways described previously, back into the pressure fluid reservoir.

The transverse bore 39 permits the push rod piston to undergo a predetermined stroke, identified by reference numeral 41, relative to the transverse pin 15. For the brake release position shown in the drawing, the transverse pin is in abutment with a stop disc 40 rigidly connected to the housing of the tandem master cylinder. The transverse pin, through pin 16, lifts the valve closure member 13 off the valve seat. Pressure fluid then can flow from the pressure fluid reservoir in the manner as described previously.

Thus, the valve closure member 13 of the central valve in the push rod piston is actuated in two different ways. First, when the push rod piston moves ahead, shoulder 18 and pin 17 act on the valve closure member, lifting it from the valve seat 14. Second, in the brake release position, the valve closure member 13 is actuated by the transverse pin 15 and by the control pin 16 lifting the valve closure member from the valve seat 14.

What is claimed is:

1. A tandem master cylinder for a hydraulic brake system for an automotive vehicle, said cylinder comprising:
   a housing having a longitudinal bore;
   a push rod piston movable within said bore along said bore;
   a floating piston movable within said bore along said bore;
   and a valve within said push rod piston having:
   (a) a valve closure member having a first face and a second face,
   (b) a valve seat,
   (c) a pull member disposed between said first face of said valve closure member to which it is rigidly connected and said floating piston, said pull member including a stop which engages said floating piston to pull said valve closure member off said valve seat when said brake system is in an anti-locking control mode, and
   (d) a push member including a first end adapted to engage said second face of said valve closure member and a transverse stop adapted to abut against said housing on its opposite end, said transverse stop abutting against said housing and causing said first end of said push member to push said valve closure member off said valve seat when said brake system is in a release position.

2. A tandem master cylinder according to claim 1 further including a first reset spring positioned between said push rod piston and said floating piston urging separation of said push rod piston and said floating piston.

3. A tandem master cylinder according to claim 2 further including a captivating sleeve positioned between said push rod piston and said floating piston and about which said first reset spring extends.

4. A tandem master cylinder according to claim 2 further including a second reset spring urging movement of said floating piston toward said push rod piston.

5. A tandem master cylinder according to claim 4 wherein said first reset spring is stronger than said second reset spring.

6. A tandem master cylinder according to claim 1 wherein said push rod piston has an axial passage and said valve is positioned within said axial passage of said push rod piston.

* * * * *